(No Model.)

J. A. MILLER.
TRACTION ENGINE.

No. 260,598. Patented July 4, 1882.

WITNESSES:
C. Neveux
C. Sedgwick

INVENTOR:
J. A. Miller
BY Munn & Co
ATTORNEYS.

UNITED STATES PATENT OFFICE.

JOHN A. MILLER, OF WADESVILLE, INDIANA.

TRACTION-ENGINE.

SPECIFICATION forming part of Letters Patent No. 260,598, dated July 4, 1882.

Application filed April 27, 1882. (No model.)

*To all whom it may concern:*

Be it known that I, JOHN A. MILLER, of Wadesville, in the county of Posey and State of Indiana, have invented a new and useful Improvement in Traction-Engines, of which the following is a full, clear, and exact description.

The object of my invention is to construct an engine that can be used in farm-work and for other purposes as a stationary engine, and also as a traction-engine for its transportation from place to place.

The invention consists in the construction and arrangement of parts as hereinafter described and claimed.

Reference is to be had to the accompanying drawings, forming a part of this specification, in which similar letters of reference indicate corresponding parts in both the figures.

Figure 1:
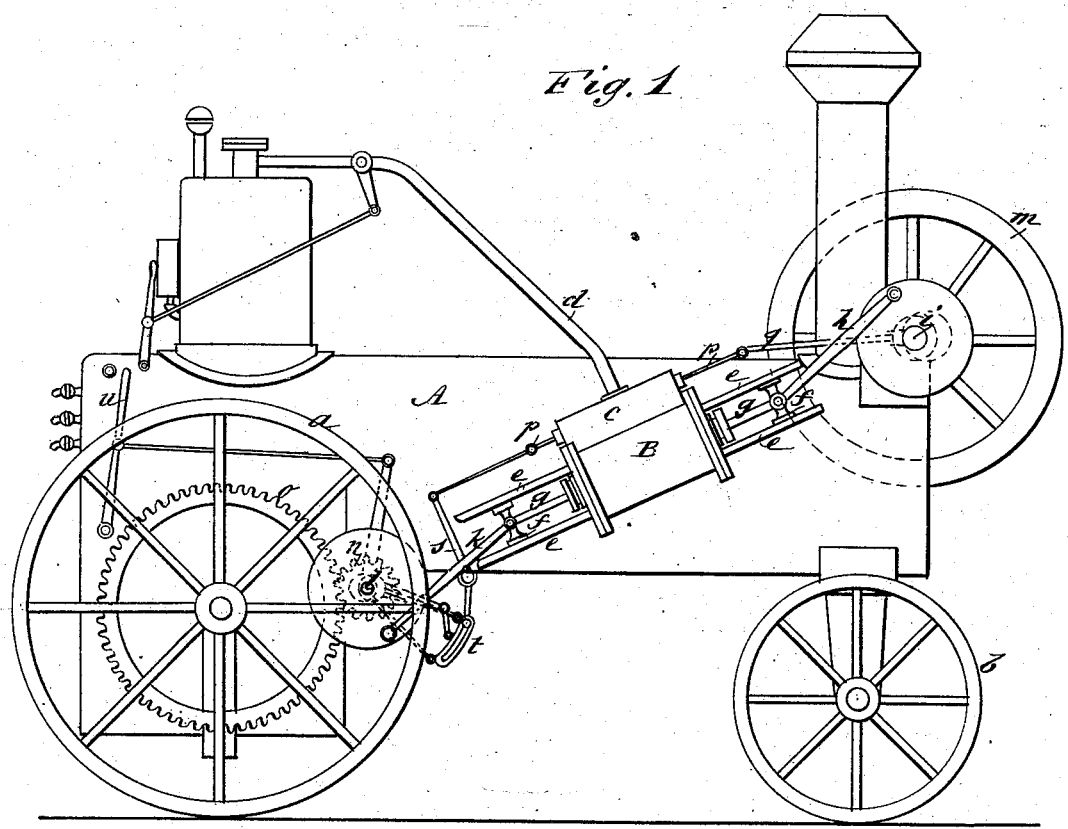
Figure 2:
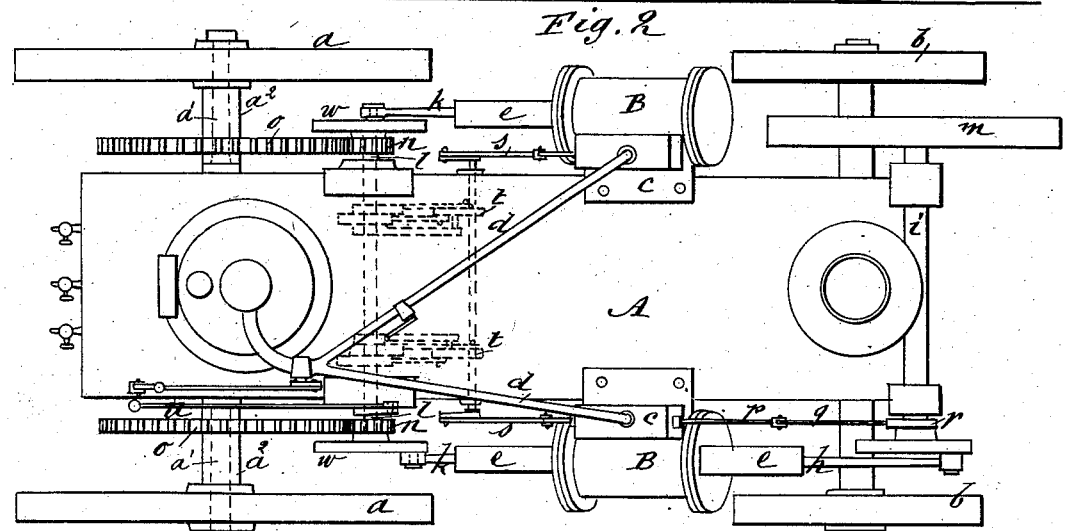

Figure 1 is a side elevation of the improved engine, and Fig. 2 is a plan view of the same.

A is the boiler, supported in a horizontal position by large wheels $a\ a$ and axles $a'$ at the rear or fire-box end, and on smaller wheels $b\ b$ at the forward end.

B B are cylinders fixed in an inclined position at opposite sides of the boiler, and $c\ c$ are steam-chests on the cylinders, connected by pipes $d$ to the steam-dome. The cylinders B are provided with slide-ways $e\ e$ at their ends for the slides $f\ f$ of the piston-rods $g\ g$, and from the slide $f$ at the upper end of the right-hand cylinder a rod, $h$, extends to and is connected to a crank-shaft, $i$, sustained at the forward end of the boiler, while the two slides $f$ at the other end connect by rods $k$ to crank-disks $w$ on a shaft, $l$, that is sustained transversely of and beneath the boiler forward of the axles of wheels $a$.

On the forward cross-shaft is a balance-wheel and pulley, $m$. The rear shaft, $l$, carries at its ends pinions $n\ n$, which mesh with gear-wheels $o\ o$, fixed on sleeves $a^2$ of the wheels $a$, so as to propel the engine.

The valve stem or rod $p$, that extends through both ends of its steam-chest, is connected at its upper end by a rod, $q$, with an eccentric, $r$, on shaft $i$. At the rear both stems $p$ connect to levers $s$, which are in turn connected to link motions $t$, of ordinary character, operated by eccentrics on shaft $l$. $u$ is a hand-lever for shifting the link-motion and reversing the valve.

In using the engine as a stationary motor the rods $k$ will be uncoupled from the slides $f$, so that the power will be applied only to the shaft $i$, to which the machinery to be driven will be connected. To arrange it as a traction-engine, rod $h$ will be uncoupled and the rods $k$ connected for rotation of shaft $l$ and application of the power to wheels $a$. The engine can thus be moved from one place of use to another, and also used to drag vehicles.

I do not limit myself to the special construction and arrangement of the detailed parts as shown and described.

Having thus described my invention, I claim as new and desire to secure by Letters Patent—

The combination with the horizontal boiler A, having an inclined cylinder, B, on each side, with a steam-chest, $c$, connected with the steam-dome by a pipe, $d$, of the slides $f$ on ways $e$, the piston-rods $g$, the rods $h\ k$, the crank-shafts $i\ l$, the balance-wheel $m$, the pinions $n\ n$, and the gear-wheels $o$ on sleeves $a^2$ of wheels $a$, whereby the engine may be used as a stationary or traction motor, as described.

JOHN A. MILLER.

Witnesses:
 HUME PELT,
 D. KRAUSGRILL.